(12) United States Patent  
Skur, III

(10) Patent No.: US 6,408,641 B1
(45) Date of Patent: Jun. 25, 2002

(54) HYBRID TURBINE COOLANT SYSTEM

(75) Inventor: Anthony I. Skur, III, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/818,116

(22) Filed: Mar. 27, 2001

(51) Int. Cl.[7] .............................. F25D 9/00; F28B 9/00; F25B 9/00
(52) U.S. Cl. ................................ 62/401; 62/88; 62/172
(58) Field of Search ........................... 62/401, 402, 88, 62/172

(56) References Cited

U.S. PATENT DOCUMENTS

| | | | | |
|---|---|---|---|---|
| 4,535,606 A | * | 8/1985 | Rannenberg | 62/402 |
| 4,550,573 A | * | 11/1985 | Rannenberg | 62/172 |
| 4,553,407 A | * | 11/1985 | Rannenberg | 62/402 |
| 5,131,235 A | * | 7/1992 | Watanabe | 62/172 |
| 5,524,442 A | * | 6/1996 | Bergman et al. | 62/86 |
| 5,906,111 A | * | 5/1999 | Lui | 62/402 |
| 6,250,097 B1 | * | 1/2001 | Lui et al. | 62/402 |

* cited by examiner

Primary Examiner—William C. Doerrler
(74) Attorney, Agent, or Firm—Jackson Walker LLP

(57) ABSTRACT

Air is extracted from a pressurized air source. An air-to-air heat exchanger (115) receives and cools the extracted pressurized air. Further, an expansion turbine (130) receives at least a portion of the cooled pressurized air from the air-to-air heat exchanger and expands the cooled pressurized air into chilled air while extracting work. An air-to-coolant heat exchanger (120) receives the chilled air from the expansion turbine which is used to chill refrigerant coolant. The air-to-air heat exchanger (115) also receives the chilled air reclaimed from the air-to-coolant heat exchanger (120), subsequent to chilling the refrigerant coolant, to cool the air extracted from the pressurized air source. In one embodiment, the extracted work is used to drive a generator (135) to supply electricity to a distribution system.

19 Claims, 2 Drawing Sheets

HYBRID TURBINE COOLANT SYSTEM

BACKGROUND OF THE INVENTION

1. Technical Field of the Invention

The present invention relates generally to coolant systems, and more particularly, to a pressurized air powered turbine coolant system.

2. Description of Related Art

Aircraft typically employ an air cycle Environmental Control System ("ECS"), to cool, filter, pressurize and otherwise condition enclosures such as an aircraft cabin and cockpit. An air cycle ECS typically operates on a flow of bleed air taken from an intermediate or high pressure stage within a jet engine having multi-compression stages or from an Auxiliary Power Unit ("APU") that is a separate turbine engine, not used for propulsion, to power the ECS. Since compressed ambient air or engine bleed air is readily available it is a convenient source of power for an airborne ECS. In most systems the engine bleed air is passed through a heat exchanger (HX), cooled by a ram air or fan driven arrangement thereby lowering its temperature. To further lower the temperature and pressure of the engine bleed air to usable levels, the bleed air is subsequently expanded in a refrigeration turbine. On a typical simple cycle system the turbine also drives the ram air fan. From the turbine, cold air is routed through the aircraft for various functions (cockpit cooling/pressurization, forced air avionics cooling, etc.). After this air has been used it is generally not reclaimed for any other use and it is discharged overboard.

The use of cooled air for the cooling requirements of current avionics is inefficient and/or impractical for high powered/liquid cooled equipment, particularly for performance sensitive aircraft such as military fighters and, more particularly for avionic retrofits. For example, an air supply duct will typically require 10 to 15 times the volume of a pair of coolant lines to cool the same heat load.

Additionally, ram air configurations and fan driven configurations both reduce the efficiency or performance of the aircraft. For, example, ram air configurations include air ducts that must run from the outer side of the aircraft, to the associated HX, which occupies additional space within the aircraft. This limitation not only consumes valuable interior space for new designs, it also makes retrofitting existing aircraft difficult or impossible. Further, an associated ram air scoop is typically exposed on an outside surface which can increase drag and increase the radar-cross-section of military aircraft. Fan driven and other types of auxiliary power devices require additional sources of power for drive. This additional work load further reduces fuel consumption efficiency and may require more equipment on board.

Vapor Cycle Systems ("VCS") have also been used to provide cooling for the aircraft avionics without the excessive use of engine bleed air. VCS typically use a supply of power other than bleed air to cool avionics (electrical power, direct engine shaft power, etc). The electronically driven compressor is typically supplied with electric power from shaft driven generators. However, since electronic power or shaft power must be supplied by the aircraft engine to run the compressor, the efficiency gained by using less bleed air is lost by the power requirements of the compressor, particularly for aircraft which rely upon speed and power such as is the case with military aircraft.

Many of the above-described problems are exacerbated when avionics are added to existing aircraft in which the retrofit aircraft must supply both additional electric power and cooling to support the new avionics. The traditional approach to solving the problem of adding more cooling and electrical power to an existing aircraft usually involves changes to multiple systems. Installing a larger generator to get more electrical power can affect the Aircraft Mechanical Accessory Drive ("AMAD") and its cooling requirements due to the higher power takeoff requirements. Adjacent systems (such as typically hydraulic pumps, emergency generators and engine starting drives), connection routing, and structure are also affected. Adding cooling capacity typically requires an increase in aircraft volume, typically involving movement of existing equipment to create the space in the airplane to install a larger ECS. A larger ECS usually requires significant changes to bleed air routing, such as larger ducts, and structural changes as well as additional ram air. The ECS bay is similar to the AMAD bay in that the available volume is fully utilized to install the highest capacity system possible during initial design of the aircraft. In order to increase available cooling the ECS would need to grow beyond its current volume. It is impractical to relocate ECS components to other bays because of the large connecting ducts. Therefore, moving avionics from an adjacent bay is a more viable approach. However, this involves re-routing many connecting harnesses that may ultimately affect other harnesses, structural penetrations, etc. which adds to the overall cost of the change. The equipment that was displaced requires new routing, racks, and structure. Removing fuel is generally considered a poor solution because it affects range and endurance.

When all of the costs associated with the above-mentioned changes are summarized, it is usually determined to be prohibitively expensive. In an industry faced with increasing fuel costs and heightened environmental concerns, considerable effort is made to reduce weight and energy requirements without sacrificing overall system performance. Many times the client must decide if it is better to buy new aircraft with the right capabilities or spend a lot of money on updating a used aircraft or compromise the capability of the new systems to live within the existing power and cooling constraints.

SUMMARY OF THE INVENTION

The present invention achieves technical advantages as an apparatus, system and method for providing chilled coolant and electrical power. Air is extracted from a pressurized air source. An air-to-air heat exchanger receives and cools the extracted pressurized air. Further, an expansion turbine receives at least a portion of the cooled pressurized air from an output of the air-to-air heat exchanger and is configured to expand the cooled pressurized air into chilled air while extracting work. An air-to-coolant heat exchanger receives the chilled air from the expansion turbine which is used to chill refrigerant coolant in a heat transfer relationship. The air-to-air heat exchanger also receives the chilled air reclaimed from the air-to-coolant heat exchanger, subsequent to chilling the refrigerant coolant, where the extracted pressurized air is cooled with the reclaimed chilled air. In one embodiment, the extracted work is used to drive a generator to supply electricity to a distribution system.

BRIEF DESCRIPTION OF THE DRAWINGS

For a more complete understanding of the present invention, of the preferred embodiment is made to the following detailed description taken in conjunction with the accompanying drawings, wherein like numerals refer to like elements, wherein.

DETAILED DESCRIPTION OF THE INVENTION

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Figure 1:
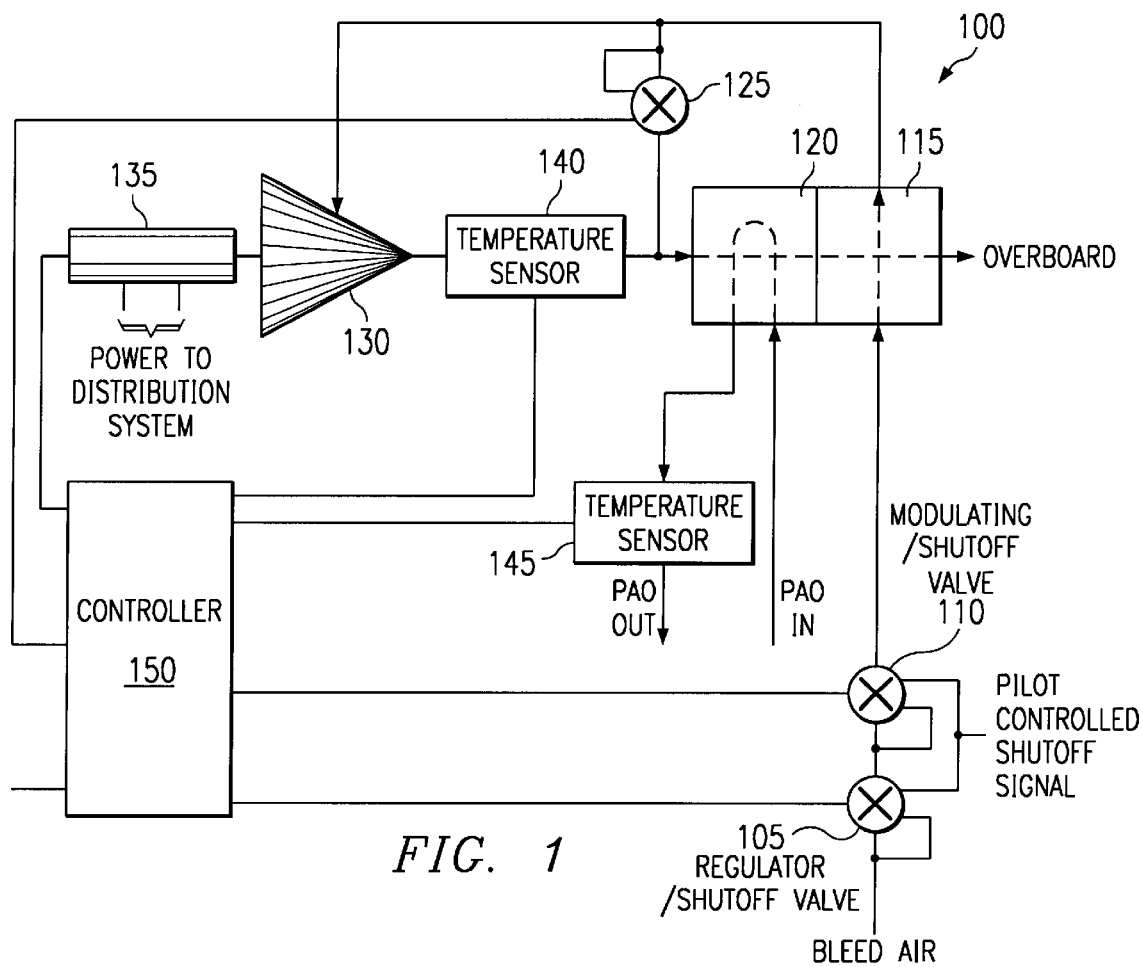
FIG. 1 illustrates a block circuit diagram of a hybrid environmental control system in accordance with an exemplary embodiment of the present invention.

Referring now to FIG. 1 there is illustrated a block circuit diagram of a hybrid environmental control system (ECS) 100 in accordance with an exemplary embodiment of the present invention. The hybrid ECS 100 receives a flow of extracted high temperature/high pressure compressed ambient air from a compression means (not shown). The compression means is preferably the compression section of a turbine engine and, more specifically, the received extracted air is compressor bleed air from an aircraft propulsive gas turbine engine compressor section. Beginning at the turbine engine, high pressure/temperature bleed air is extracted from the engine and routed via duct to an air-to-air HX 115, through redundant shutoff valves (105 and 110), where the bleed air is cooled to a lower temperature and/or pressure by a flow of discharged air from the air-to-coolant HX 120. The shutoff valves 105, 110 enable redundancy in which they both have the ability to shutoff the bleed air and a failure of either one will not result in the introduction of bleed air to the ECS at engine pressures. More is said about the air-to-coolant HX 120 in a later section of the present Detail Description.

The shutoff valves 105 and 110 can be variable controlled valves. The valves 105 and 110 provide over-pressure protection and shutoff as in the case of a conventional system. The shutoff values can be controlled by the controller 150 to vary the amount of bleed air supplied to the air-to-air HX 115. Additionally, the shutoff values can be controlled from a pilot initiated signal and/or manually.

After the bleed air is pre-cooled through HX 115, the pre-cooled bleed air is routed, via duct, to a expansion turbine 130. Air temperatures in the system can vary significantly depending on the amount of cooling required, the pressure and temperature of the bleed air, the moisture content of the air, and the amount of power generated. Typically the bleed air from the engine is approximately 1000 to 1200 degrees F and several hundred psi. Preferably, the pre-cooled bleed air can have a temperature reduction of several hundred degrees F and have an air pressure reduced to around 100 psi. The turbine 130 expands the air producing low pressure/cold air or chilled air and a significant amount of power. Preferably, air leaving the expansion turbine can be anywhere from approximately −100 to 50 degrees F and a few psi above ambient pressure. In one embodiment of the present invention, the turbine 130 is drivenly connected through a shaft, for example, to an electric generator 135. The power from the air expansion process is used to drive the generator 135 to produce electricity. The power from an expansion turbine has traditionally been use to drive a compressor (for a bootstrap cooling system) or a ram air fan to pull ram air through a bleed-air to ram-air heat exchanger (for a simple cycle system). Ram air is commonly used as the heat sink for environmental control systems. However, since there is no compressor or ram air circuit in this embodiment of the present invention, power from the turbine is instead used to run the generator 135, thus serving as an energy recovery means that uses a portion of the unrequired or unused energy from the air expansion process to produce electricity for the distribution system of an aircraft for example. This additional electricity can lower the output requirement of other airborne generator devices or can be used, for example, to power retrofit avionics.

Following the air expansion, the chilled air is cold enough to enable the air-to-coolant heat exchange portion of the coolant system. Depending on the type of avionics to be cooled, the avionics can require coolant at 60 degrees F to 80 degrees F, for example. Preferably, the air temperature should be at least 15 degrees F below the coolant temperature the avionics requires for efficient heat transfer. The chilled air is routed to the air-to-coolant HX 120 to cool the coolant. Typically, the coolant is poly alpha olefin (PAO) hydraulic fluid but it can include other types of fluids optimized for heat transfer. From the air-to-coolant HX 120, the PAO is routed to the avionics equipment (not shown) for cooling.

Prior to entering the air-to-coolant HX 120, a portion of pre-cooled bleed air is diverted, before reaching the expansion turbine 130, through an add-heat-valve 125, to controllably mix with the chilled air exiting the turbine 13 0. The add-heat-valve air is mixed with the chilled air downstream of the turbine 130 for the purpose of modulating the temperature of the chilled air as it enters the air-to-coolant HX 120 to maintain a predetermined chill temperature of the PAO coolant and to prevent ice formation on the face of the heat exchanger during high ambient humidity conditions for example. The controller monitors and controls the system through connections with temperature sensors 140 and 145, add-heat-valve 125, and shutoff valves 105 and 110. The controller can also be used to monitor and control the generator 135. The controller can control coolant temperature inlet and discharge coolant temp from the avionics, system capacity (variable avionics loads), power generated (highly dynamic depending on load and engine power), and a load (not shown) separate of the avionics to dump excess unused power.

The air leaving the air-to-coolant HX 120 is still significantly cooler compared to the engine bleed air and is routed to the air-to-air HX 115 for use as a heat sink to cool the incoming engine bleed air. Subsequent to cooling the bleed air, the heat sink air leaving the air-to-air HX 115 is now low pressure/high temperature and is routed overboard.

Figure 2:
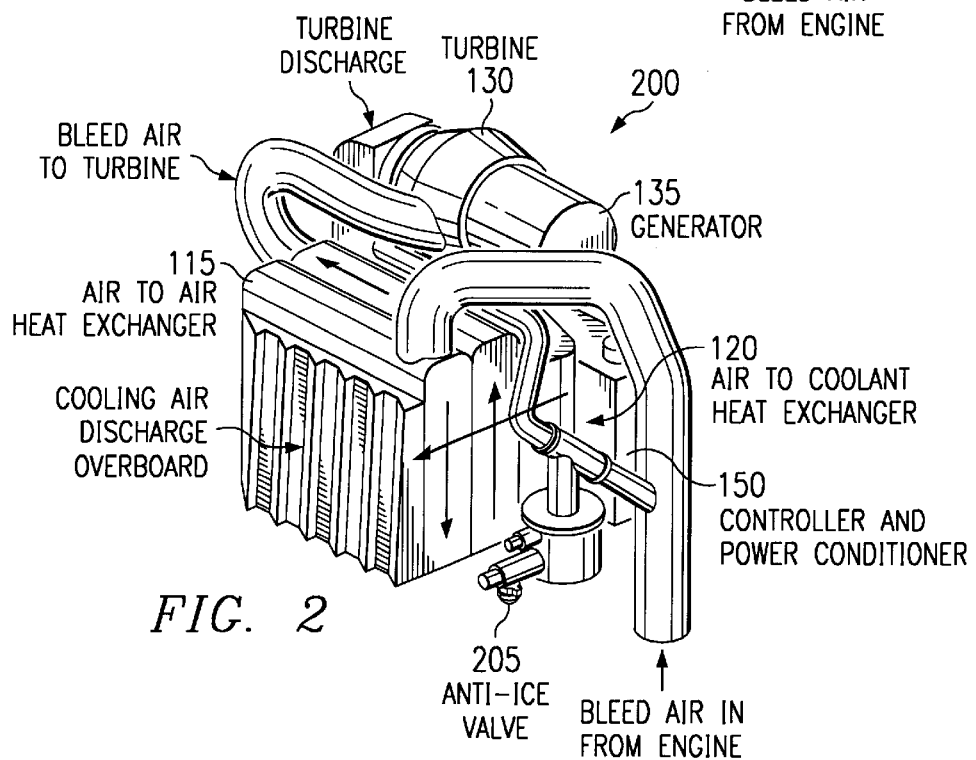
FIG. 2 shows a perspective view illustrating a hybrid turbine cooling system pack in accordance with an embodiment of the present invention.

Referring now to FIG. 2 there is shown a perspective view illustrating a hybrid turbine cooling system pack 200 in accordance with an embodiment of the present invention. As shown, bleed air is routed from the propulsion turbine engine (not shown), via duct, to the air-to-air HX 115. From the air-to-air HX 115, the bleed air is further routed to the turbine 130 where the air is expanded. A portion of the bleed air from the propulsion turbine engine is routed, via a bypass duct, through an anti-ice device 205. The anti-ice device can be used to enable hot air to be mixed with the air from the turbine 130 to prevent ice formation on the face of the heat exchanger (good design would make this a rare event). The expansion of the air produces a predetermined amount of useful work and chilled air. Using the work produced in the expansion, the turbine 130 drives the generator 135 to supply electricity to the distribution system of the aircraft. From the turbine 130, chilled air is routed first through the air-to-coolant HX 120 and, subsequently, back through the air-to-air HX 115, and lastly is discharged overboard.

Since the hybrid turbine cooling system pack 200 does not require complex plumbing or a ram air circuit, it can be packaged in a fairly small volume. The size depends on how much cooling and power are required—with no ram air circuit or ram air HX the present system can reduce volume requirements by approximately 20%, even greater if the ram air circuit requires a long duct. The size of the device is dependent on how much cooling is required and to a lesser extent how much electrical power is required. The hybrid turbine cooling system pack 200 can be used, for example, in retrofit applications where existing aircraft require additional cooling and/or electrical requirements. Generally, during an aircrafts lifetime, avionics are added as technology advances or performance demand increases.

The hybrid turbine cooling system of the present invention is particularly advantageous, for high performance aircraft retrofits, over the typical methods of trying to make the existing air cycle system larger or trying to incorporated a vapor cycle system in the aircraft. Increasing the existing air cycle system disadvantageously increases the use of propulsion bleed air and can disadvantageously require additional ram air circuits. Vapor cycle packs are very heavy and require large amounts of electrical power. Furthermore, vapor cycle systems generally require a low to moderate temperature heat sink, no more than about 170° F. High performance aircraft can have ram air temperatures well over 200° F. requiring the use of complex ram air/fuel heat sinks. The proposed system does not suffer from excessive drag or weight associated with ram air circuits or high ram air temperatures since a ram air circuit is not used. The vapor cycle systems also have high electrical load demand resulting in the use of large generators.

Figure 3A:
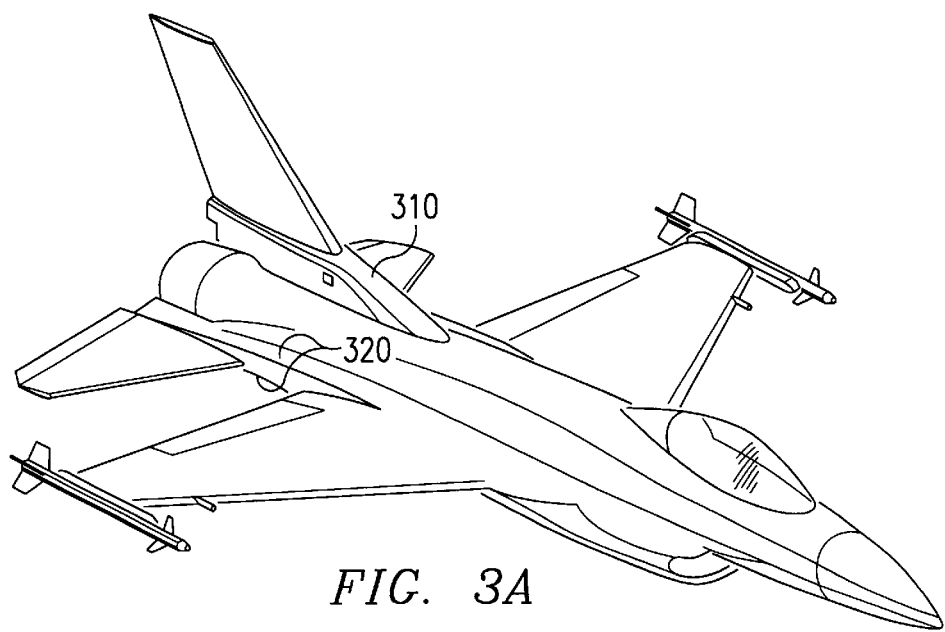
FIG. 3A shows a perspective view of an exemplary aircraft illustrating retrofit mounting locations for the hybrid environmental control system in accordance with an embodiment of the present invention.

FIG. 3A illustrates exemplary retrofit placement for the hybrid turbine cooling system pack 200 in a high performance aircraft. One exemplary retrofit location for the cooling pack 200 is under the tail root fairing 310 of a typical high performance aircraft. This location lends itself well because of the relative ease of routing bleed air to this location and because little or no fairing modification is needed to accommodate the retrofit. While it appears this same area could be used for installing a conventional air cycle system, it would require adding a ram air circuit and may require significant fairing modification. Other exemplary retrofit locations are shown by item 320. Retrofitting these locations could require the addition of an outer blister to the top or side of the fuselage.

Figure 3B:
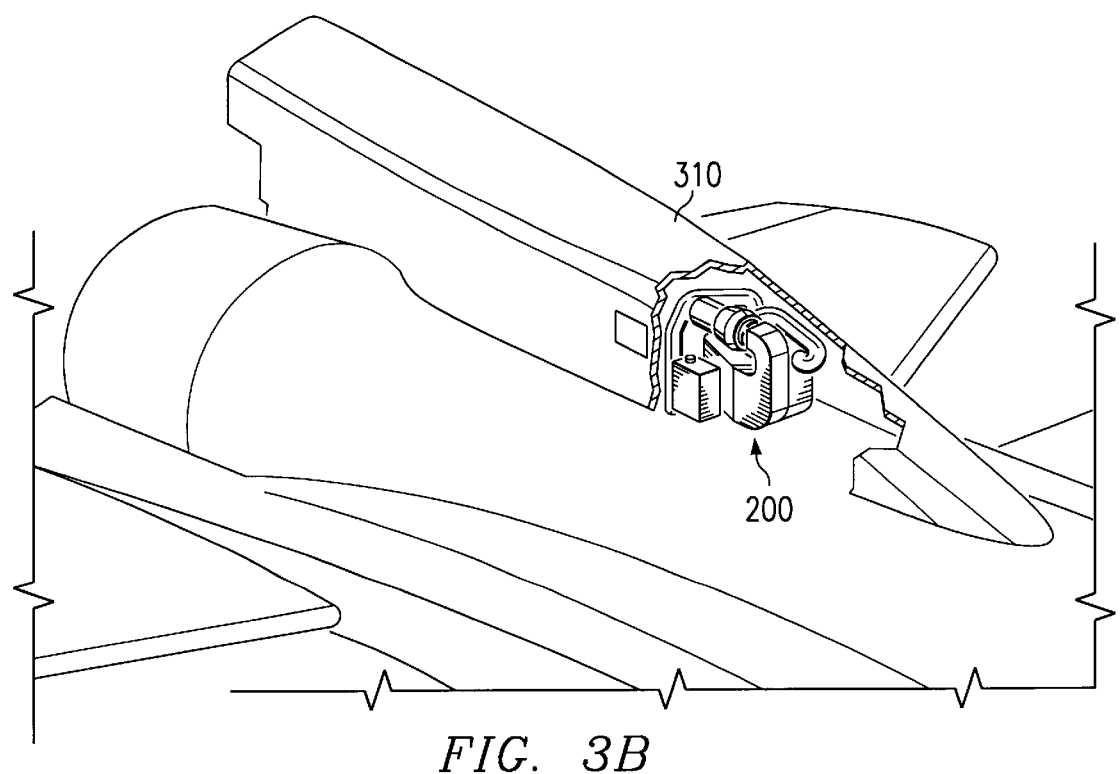
FIG. 3B illustrates a more detailed view of the retrofit mounting location illustrated in FIG. 3A.

Referring now to FIG. 3B there is illustrated an exploded view of the tail root fairing 310 shown in FIG. 3A. A portion of the tail root fairing 310 is cut away to illustrate the placement of the hybrid turbine cooling system pack 200.

Although preferred embodiments of the method and system of the present preferred embodiments has been illustrated in the accompanied drawings and described in the foregoing detailed description, it is understood that obvious variations, numerous rearrangements, modifications and substitutions can be made without departing from the spirit and the scope of the invention as defined by the appended claims.

What is claimed is:

1. A coolant system to provide chilled coolant, said coolant system being powered from pressurized air extracted from a pressurized air source, said coolant system comprising:

an air to air heat exchanger having a first intake for receiving said extracted pressurized air and configured to cool said extracted pressurized air;

an expansion turbine having an intake for receiving at least a portion of cooled pressurized air from an output of said air to air heat exchanger and configured to expand said cooled pressurized air into chilled air while extracting work therefrom; and an air to coolant heat exchanger having an air intake for receiving said chilled air from an output of said expansion turbine and having a coolant intake for receiving a refrigerant coolant and configured to chill said refrigerant coolant in a heat transfer relationship; and wherein said air to air heat exchanger further having a second intake for receiving reclaimed chilled air from an output of said air to coolant heat exchanger subsequent to chilling said refrigerant coolant, wherein said extracted pressurized air is cooled in a heat transfer relationship with only said reclaimed chilled air.

2. The coolant system of claim 1 further including a generator having a drive coupled to said expansion turbine and configured to generate electricity, wherein at least a portion of said extracted work is used to drive said generator.

3. The coolant system of claim 2, wherein said generated electricity is route to an electrical distribution system.

4. The coolant system of claim 1, wherein said air to coolant heat exchanger further having a coolant output for outputting said chilled refrigerant coolant to a coolant distribution system.

5. The coolant system of clam 1, further including a by-pass having a controllable valve for directing a portion of said cooled pressurized air to said air to coolant heat exchange air intake.

6. The coolant system of claim 1 further including a first sensor having an output for outputting a signal indicative of a temperature of said chilled air and a second sensor having an output for outputting a signal indicative of a temperature of said chilled refrigerant coolant.

7. The coolant system of claim 1 further including a controllable shutoff valve having an input for receiving said extracted pressurized air from said pressurized air source and configured to modulate a pressurized air output to said air to air heat exchanger first intake.

8. The coolant system of claim 1 further including a controller having a plurality of inputs for receiving signals indicative of a temperature of said chilled air and said chilled refrigerant coolant and having an output for outputting a control signal to a controllable valve for directing said controllable valve to modulate an amount of cooled pressurized air directed to said air to coolant heat exchanger air intake.

9. The coolant system of claim 8, wherein said controller is further configured to output a second control signal to a second controllable valve configured to limit an amount of extracted pressurized air directed to said air to air heat exchanger first intake.

10. The coolant system of claim 1, wherein said refrigerant coolant is a liquid coolant adapter for cooling avionics.

11. A modular coolant pack to provide chilled coolant to avionics equipment aboard an aircraft with an existing coolant system, said modular coolant pack powered from bleed air extracted from a propulsion turbine engine of said aircraft without using air ambient to said aircraft, said modular coolant pack comprising:

a first heat exchanger having a first intake for receiving said bleed air and a second intake for receiving reclaimed chilled air, and configured to cool said bleed air in a heat transfer relationship with said reclaimed chilled air without using ram air to cool said bleed air;

an expansion turbine having an intake for receiving at least a portion of cooled bleed air from an output of said first heat exchanger and configured to expand said cooled bleed air into chilled air while extracting work therefrom; and a second heat exchanger having an air intake for receiving said chilled air from an air output of said expansion turbine and having a coolant intake for receiving a refrigerant coolant, and configured to chill said refrigerant coolant in a heat transfer relationship with said chilled air, wherein said chilled air is output as said reclaimed chilled air through an air output to said first heat exchanger second intake and chilled coolant is output to said avionics equipment through a coolant output.

12. The modular coolant pack of claim 11 further including a generator having a drive coupled to said expansion turbine and configured to generate electricity, wherein at least a portion of said extracted work is used to drive said generator and said generated electricity is applied to an existing distribution system of said aircraft or to a dedicated avionics load.

13. The modular coolant pack of claim 11 further including a controller having an input for receiving a signal indicative of a temperature of said chilled coolant and configured to output a control signal enabling temperature modulation of said chilled coolant.

14. A method of providing chilled liquid coolant, comprising:

extracting bleed air from a propulsion turbine engine;

cooling said bleed air in a heat exchange relationship with reclaimed chilled air, wherein only said reclaimed chilled air is used for said heat exchange relationship cooling of said bleed air;

expanding said cooled bleed air within an expansion turbine thereby producing chilled air;

chilling liquid coolant in a heat exchange relationship with said chilled air; and circulating said chilled air, subsequent- to chilling said liquid coolant, to provide said reclaimed chilled air for said cooling a portion of said bleed air.

15. The method of claim 14 further including extracting work from said expansion of said cooled bleed air.

16. The method of claim 15 further including driving an electricity generator with said work extracted from said expansion of said cooled bleed air and routing said generated electricity to a distribution system.

17. The method of claim 14 further including controlling temperature of said chilled liquid coolant by modulating said extraction of bleed air.

18. The method of claim 14 further including controlling temperature of said chilled liquid coolant by mixing a portion of said cooled bleed air with said chilled air prior to chilling said liquid coolant.

19. The method of claim 14 further including controlling temperature of said chilled liquid coolant by modulating said extraction of bleed air and mixing a portion of said cooled bleed air with said chilled air prior to chilling said liquid coolant.

* * * * *